United States Patent
Westberg et al.

(10) Patent No.: US 10,791,194 B2
(45) Date of Patent: Sep. 29, 2020

(54) CACHING IN WIRELESS COMMUNICATION NETWORKS

(71) Applicant: Telefonaktiebolaget LM Ericsson (publ), Stockholm (SE)

(72) Inventors: Lars Westberg, Enkoping (SE); Hans Eriksson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/959,149

(22) Filed: Apr. 20, 2018

(65) Prior Publication Data

US 2018/0241839 A1 Aug. 23, 2018

Related U.S. Application Data

(63) Continuation of application No. 14/353,765, filed as application No. PCT/EP2011/068823 on Oct. 27, 2011, now Pat. No. 9,967,362.

(51) Int. Cl.
*H04L 29/08* (2006.01)
*H04L 12/26* (2006.01)

(52) U.S. Cl.
CPC ...... *H04L 67/2857* (2013.01); *H04L 43/0817* (2013.01); *H04L 67/2847* (2013.01)

(58) Field of Classification Search
CPC .................................................. H04L 67/2857
USPC ....................................................... 709/216
See application file for complete search history.

(56) References Cited

U.S. PATENT DOCUMENTS

| | | | |
|---|---|---|---|
| 5,109,486 A | 4/1992 | Seymour | |
| 5,182,746 A | 1/1993 | Hurlbut et al. | |
| 5,255,307 A | 10/1993 | Mizikovsky | |
| 5,432,824 A | 7/1995 | Zheng et al. | |
| 5,630,049 A * | 5/1997 | Cardoza | G06F 11/3664 714/25 |
| 6,160,878 A | 12/2000 | Hau et al. | |

(Continued)

FOREIGN PATENT DOCUMENTS

| | | | | |
|---|---|---|---|---|
| CN | 1152826 A * | 6/1997 | ......... | H04Q 11/0478 |
| CN | 101405966 A | 4/2009 | | |

(Continued)

OTHER PUBLICATIONS

Cisco Systems, "Network Caching", 2000 (Year: 2000).*

(Continued)

*Primary Examiner* — Ondrej C Vostal
(74) *Attorney, Agent, or Firm* — NDWE LLP

(57) ABSTRACT

A Network Reporting Entity (NRE) and a User Equipment (UE) as well as a respective method therein for use in a wireless communication network for enabling controlling data transfer between the UE and a network cache are provided. The NRE receives, from the UE, a request to start reporting network status and transmits, to the UE, information regarding the status of the network, the information pertaining to whether network condition is in a state where a data transfer is preferred or not, wherein the NRE obtains the information regarding the status of the network from the Network Conditions Information Entity (NCIE). In this manner, the UE is enabled to control the data transfer between the UE and the network cache.

21 Claims, 8 Drawing Sheets

(56) References Cited

U.S. PATENT DOCUMENTS

| | | | |
|---|---|---|---|
| 6,170,013 B1* | 1/2001 | Murata | H04L 67/1095 709/229 |
| 6,237,060 B1* | 5/2001 | Shilts | G06F 12/0253 711/100 |
| 6,275,710 B1 | 8/2001 | Oinonen et al. | |
| 6,438,138 B1 | 8/2002 | Kamiya | |
| 6,675,211 B1 | 1/2004 | Mamaghani et al. | |
| 6,760,812 B1* | 7/2004 | Degenaro | G06F 12/0888 711/133 |
| 6,779,030 B1 | 8/2004 | Dugan et al. | |
| 6,868,439 B2* | 3/2005 | Basu | G06F 16/9574 709/213 |
| 6,934,735 B1* | 8/2005 | Emens | H04L 67/325 709/203 |
| 7,039,683 B1* | 5/2006 | Tran | G06F 12/0868 709/213 |
| 7,110,773 B1 | 9/2006 | Wallace et al. | |
| 7,457,262 B1 | 11/2008 | Doshi et al. | |
| 7,508,765 B2 | 3/2009 | Lefebvre et al. | |
| 7,706,265 B2* | 4/2010 | Monette | H04L 12/4641 370/230 |
| 7,765,292 B2 | 7/2010 | Sakaguchi et al. | |
| 7,809,359 B2 | 10/2010 | Ung et al. | |
| 7,809,815 B2 | 10/2010 | Goldberg et al. | |
| 8,265,618 B2 | 9/2012 | Macnaughtan et al. | |
| 8,320,314 B2 | 11/2012 | Jung et al. | |
| 8,583,079 B2 | 11/2013 | Chawla | |
| 8,880,765 B2 | 11/2014 | Melvin, Jr. et al. | |
| 8,966,039 B1 | 2/2015 | Fultz et al. | |
| 9,143,976 B2 | 9/2015 | Raleigh et al. | |
| 9,674,575 B2 | 6/2017 | Jennings et al. | |
| 2001/0021186 A1 | 9/2001 | Ono et al. | |
| 2002/0161837 A1 | 10/2002 | Sasaki et al. | |
| 2003/0083073 A1 | 5/2003 | Cossins et al. | |
| 2003/0100321 A1 | 5/2003 | Rao et al. | |
| 2003/0140251 A1 | 7/2003 | Marin et al. | |
| 2004/0172466 A1 | 9/2004 | Douglas et al. | |
| 2004/0267939 A1 | 12/2004 | Yumoto et al. | |
| 2005/0010648 A1* | 1/2005 | Ramaswamy | H04L 12/5692 709/217 |
| 2005/0143097 A1 | 6/2005 | Wilson et al. | |
| 2005/0282526 A1 | 12/2005 | Leppanen et al. | |
| 2005/0283455 A1* | 12/2005 | Kemmer | G06Q 40/04 |
| 2006/0036729 A1 | 2/2006 | Sakaguchi et al. | |
| 2006/0056426 A1 | 3/2006 | Wakameda et al. | |
| 2006/0178153 A1 | 8/2006 | Tenny et al. | |
| 2006/0195891 A1 | 8/2006 | Freyman et al. | |
| 2006/0223593 A1 | 10/2006 | Ishak | |
| 2006/0227725 A1 | 10/2006 | Huotari et al. | |
| 2007/0025304 A1* | 2/2007 | Leelahakriengkrai | H04W 36/02 370/338 |
| 2007/0091810 A1 | 4/2007 | Kim et al. | |
| 2007/0149133 A1 | 6/2007 | Lee | |
| 2007/0239862 A1 | 10/2007 | Bronez et al. | |
| 2008/0032707 A1 | 2/2008 | Bhogal et al. | |
| 2008/0108330 A1 | 5/2008 | O'Neil et al. | |
| 2008/0109823 A1 | 5/2008 | Whitfield et al. | |
| 2008/0132225 A1 | 6/2008 | Ranta et al. | |
| 2008/0310347 A1 | 12/2008 | Morishige et al. | |
| 2009/0012675 A1 | 1/2009 | Laghrari et al. | |
| 2009/0067394 A1 | 3/2009 | Van | |
| 2009/0098858 A1 | 4/2009 | Gogic | |
| 2009/0125694 A1* | 5/2009 | Innan | G06F 12/023 711/170 |
| 2009/0141631 A1 | 6/2009 | Kim et al. | |
| 2009/0170426 A1 | 7/2009 | Jung et al. | |
| 2009/0201810 A1 | 8/2009 | Kazmi et al. | |
| 2009/0286541 A1 | 11/2009 | Maheshwari et al. | |
| 2009/0292760 A1 | 11/2009 | Leedberg et al. | |
| 2010/0020717 A1 | 1/2010 | McGregor et al. | |
| 2010/0034176 A1 | 2/2010 | Heo et al. | |
| 2010/0061370 A1* | 3/2010 | Gerber | H04L 45/00 370/392 |
| 2010/0067680 A1 | 3/2010 | Hanson et al. | |
| 2010/0075650 A1 | 3/2010 | Tsai et al. | |
| 2010/0082782 A1 | 4/2010 | Ding | |
| 2010/0128677 A1 | 5/2010 | Liu et al. | |
| 2010/0156710 A1 | 6/2010 | Wirola et al. | |
| 2010/0191862 A1* | 7/2010 | Forbes, Jr. | G06Q 10/00 709/240 |
| 2010/0205292 A1* | 8/2010 | Diaz | H04L 12/40013 709/224 |
| 2010/0254262 A1* | 10/2010 | Kantawala | H04L 12/56 370/232 |
| 2010/0284286 A1 | 11/2010 | Bourdeaut | |
| 2010/0309867 A1 | 12/2010 | Palanki et al. | |
| 2011/0093583 A1 | 4/2011 | Piemonte et al. | |
| 2011/0099236 A1* | 4/2011 | Vuong | H04L 41/0627 709/206 |
| 2011/0126237 A1 | 5/2011 | Lee et al. | |
| 2011/0145317 A1* | 6/2011 | Serban | H04W 4/00 709/203 |
| 2011/0184879 A1 | 7/2011 | Ylivainio et al. | |
| 2011/0196943 A1* | 8/2011 | Bornstein | H04L 29/06 709/219 |
| 2011/0199898 A1* | 8/2011 | Cho | H04W 76/18 370/230 |
| 2011/0202185 A1 | 8/2011 | Imes et al. | |
| 2011/0235546 A1 | 9/2011 | Horn et al. | |
| 2011/0292894 A1 | 12/2011 | Wu | |
| 2012/0015621 A1 | 1/2012 | Cerny et al. | |
| 2012/0021770 A1* | 1/2012 | Naqvi | G06F 17/3087 455/456.3 |
| 2012/0044804 A1 | 2/2012 | Rahman et al. | |
| 2012/0044928 A1* | 2/2012 | Bhattad | H04J 11/0083 370/350 |
| 2012/0066305 A1 | 3/2012 | Cheng et al. | |
| 2012/0149362 A1 | 6/2012 | Tooher et al. | |
| 2012/0166665 A1 | 6/2012 | Martin | |
| 2012/0182859 A1 | 7/2012 | Ikeda et al. | |
| 2012/0185594 A1* | 7/2012 | Huysegems | H04L 47/10 709/224 |
| 2012/0195281 A1* | 8/2012 | Kim | H04W 72/1263 370/329 |
| 2012/0246294 A1 | 9/2012 | Eaton et al. | |
| 2012/0295650 A1* | 11/2012 | Futaki | H04W 52/0216 455/507 |
| 2013/0042011 A1* | 2/2013 | Sugizaki | H04Q 3/0045 709/227 |
| 2013/0052991 A1 | 2/2013 | Naftolin | |
| 2013/0080611 A1* | 3/2013 | Li | H04N 21/222 709/223 |
| 2013/0163492 A1* | 6/2013 | Wong | H04L 5/001 370/311 |
| 2013/0215822 A1 | 8/2013 | Worrall et al. | |
| 2014/0256334 A1 | 9/2014 | Kazmi et al. | |

FOREIGN PATENT DOCUMENTS

| | | |
|---|---|---|
| CN | 101803261 A | 8/2010 |
| WO | 2010010408 A1 | 1/2010 |

OTHER PUBLICATIONS

Wikipedia, "Web cache", 2020 (Year: 2020).*
Advisory Action from U.S. Appl. No. 14/353,765, dated Jan. 11, 2017, 3 pages.
Communication pursuant to Article 94(3) EPC for Application No. 11778844.8, dated Feb. 12, 2018, 4 pages.
Final Office Action from U.S. Appl. No. 14/353,765 dated Oct. 17, 2016, 23 pages.
First Office Action from Chinese Patent Application No. 201180074431. 7, dated Aug. 1, 2016, 12 pages.
International Preliminary Report on Patentability, Application No. PCT/EP2011/068823, dated May 8, 2014, 8 pages.
International Search Report for Application No. PCT/EP2011/ 068823, dated Feb. 6, 2012, 4 pages.
Merriam-Webster, "Cache," 2016.

(56) References Cited

OTHER PUBLICATIONS

Non-Final Office Action from U.S. Appl. No. 14/353,765 dated Apr. 11, 2016, 18 pages.
Non-Final Office Action from U.S. Appl. No. 14/353,765, dated Jun. 28, 2017, 22 pages.
Notice of Allowance from U.S. Appl. No. 14/353,765, dated Dec. 21, 2017, 23 pages.
Notification to Grant from Chinese Patent Application No. 201180074431.7, dated Sep. 18, 2017, 2 pages.
RFC 4666: Morneault, et al., "Signaling System 7 (SS7) Message Transfer Part 3 (MTP3)—User Adaptation Layer (M3UA)," Network Working Group, Standards Track, Request for Comments: 4666, Sep. 2006, 125 pages.
RFC 6137: Zisiadis, et al., "The Network Trouble Ticket Data Model (NTTDM)," Independent submission Feb. 2011, 47 pages.
Rosenberg J., et al., "SIP: Session Initiation Protocol," Network Working Group, Request for Comments: 3261, 2002, pp. 269, The Internet Society.
Second Office Action from Chinese Patent Application No. 201180074431.7, dated Mar. 2, 2017, 5 pages.
Shanmugavadivu et al., "Caching Technique for Improving Data Retrieval Performance in Mobile Ad Hoc Networks", 2010.
Stewart R., "Stream Control Transmission Protocol", Network Working Group, Request for Comments (RFC): 4960; http://tools.ietf.org/html/rfc4960, (Sep. 2007), 152 pages.
Third Office Action from Chinese Patent Application No. 201180074431.7, dated Jun. 8, 2017, 4 pages.
Written Opinion for Application No. PCT/EP2011/068823, dated Feb. 6, 2012, 7 pages.
Zheng et al., Efficient Event Delivery in Publish/Subscribe Systems for Wireless mesh Networks, 2007.
"Network Caching—White Paper," 2000, 12 pages, Cisco Systems, Inc., downloaded from https://www.cisco.com/c/dam/global/de_at/assets/docs/Net_Caching.pdf.
Office Action, EP App. No. 11778844.8, dated Jan. 7, 2020, 5 pages.

* cited by examiner

CACHING IN WIRELESS COMMUNICATION NETWORKS

CROSS-REFERENCE TO RELATED APPLICATIONS

This application is a continuation of application Ser. No. 14/353,765, filed Aug. 14, 2014, which is a National stage of International Application No. PCT/EP2011/068823, filed Oct. 27, 2011, which are all hereby incorporated by reference.

TECHNICAL FIELD

The present disclosure relates to caching in cellular communication networks and in particular to client caching architecture and interfaces.

BACKGROUND ART

Today's cellular networks for wireless communication are required to support a large variety of different forms of communications. Some examples of communications typically taking place in a communication network is voice calls, video calls, transfer of small and large data files, streaming of audio and video and so on. In addition to the various forms of communications, the communications take place at different times during the day and night. This leads to a highly fluctuating traffic volume during the day and night hours. Still further, the traffic volume also differs from one cell to the other. When planning and designing capacity in a cellular network, the different peaks of traffic volume or load in the different cells in the network are taken into account in order to provide a reliable communication network that will to a large extent provide its customers with requested communication services to all the customers in each cell, also during peak hour traffic.

Since the communication networks are designed to provide or support requested communication services to all the customers in each cell, also during peak hour traffic, substantial capacity exists which remains unused during off-peak hours. During off-peak hours, the traffic volume or load is smaller, which means that the capacity which remains unused is wasted.

In order to smooth out the traffic volume or load over time, the radio network can control caching of data information communication which need not be delivered in real-time.

One approach for controlling the traffic volume or load is to virtually partition a storage of the client or user equipment such that at least one partition of the storage of the client or user equipment is owned by the operator of the wireless communication network. Such a solution implies that the network operator has access to the specific partition and the end-user, i.e. the user of the user equipment, cannot access it, while the operator is in control of the caching of data information in the user equipment using the specific partition.

Another approach is to download the data information to a storage or cache in the application layer at the network.

The above approaches suffer from several drawbacks. In the first solution, the user of the user equipment has to "give up" a partition of his/her storage capacity to the operator and the user will not be in control over this partition. In the second solution, the downloading to the storage or cache in the application layer may take place at an undesirable point in time when the radio conditions are unfavourable or the network load is already high.

SUMMARY

It is an object of the solution described herein to address at least some of the problems outlined above. In particular, it is an object to provide a Network Reporting Entity, NRE, and a User Equipment, UE, as well as a respective method therein for use in a wireless communication network for enabling controlling data transfer between the UE and a network cache, wherein the NRE is adapted to communicate with a Network Conditions Information Entity, NCIE. These objects and others may be obtained by providing a NRE and a UE and a method in a NRE and a UE according to the independent claims attached below.

According to an aspect a method in a NRE for use in a wireless communication network for enabling controlling data transfer between a first UE and a network cache, the NRE being adapted to communicate with a Network Conditions Information Entity, NCIE is provided. The method comprises receiving, from the first UE, a request to start reporting network status. The method further comprises transmitting, to the first UE, information regarding the status of the network, the information pertaining to whether network condition is in a state where a data transfer is preferred or not, wherein the NRE obtains the information regarding the status of the network from the NCIE. In this manner, the first UE is enabled to control the data transfer between the UE and the network cache.

According to an aspect, a method in a UE for controlling data transfer between the UE and a network cache in a wireless communication network is provided. The method comprises requesting, from a NRE, a report regarding the status of the wireless communication network. The method further comprises receiving, from the NRE, the report regarding the status of the wireless communication network and determining whether to initiate data transfer between the UE and the network cache based on the received status report of the wireless communication network.

According to an aspect, a NRE for use in a wireless communication network, the NRE being adapted to enable controlling data transfer between a first UE and a network cache, the NRE being adapted to communicate with a NCIE is provided. The NRE comprises a receiving unit adapted to receive a request from the first UE requesting starting to report network status information to the first UE. The NRE further comprises a transmitting unit adapted to transmit, to the first UE, information regarding the status of the network. The information pertains to whether the network condition is in a state where a data transfer is preferred or not, wherein the NRE obtains the information regarding the status of the network from the NCIE. In this manner, the first UE is enabled to control the data transfer between the UE and the network cache.

According to an aspect, a UE adapted to control data transfer between the UE and a network cache in a wireless communication network is provided. The UE comprises a requesting unit adapted to request a report regarding the status of the wireless communication network from a NRE; and a receiving unit adapted to receive the report regarding the status of the wireless communication network from the NRE. The UE further comprises a determining unit adapted to determine whether to initiate data transfer between the UE and the network cache based on the received status report of the wireless communication network.

The NRE, the UE and the respective method therein have several advantages. One advantage is that the NRE provides the UE with information such that the UE can initiate data transfer at the most favourable conditions regarding the load in the wireless communication network. It further enables the UE to decide whether to engage in data transfer with regards to both the network conditions and with regards to the need for the UE to engage in the data transfer. A further advantage is that traffic load can be smoothed out over time, meaning that the UE may, based on the information from the NRE, refrain from engaging in transferring data with the network cache during periods of high traffic load in the cell or in the wireless communication network and instead engage in transferring data with the network cache during periods of low traffic load in the cell or in the wireless communication network.

BRIEF DESCRIPTION OF DRAWINGS

Embodiments will now be described in more detail in relation to the accompanying drawings, in which.

DETAILED DESCRIPTION

Briefly described, exemplifying embodiments of a Network Reporting Entity, NRE, for use in a wireless communication network and a User Equipment, UE, and a respective method therein are provided for enabling controlling data transfer between a first UE and a network cache. By providing the UE with information regarding the current condition in the wireless communication network, the UE is enabled to make qualified decision whether to engage in data transfer or to refrain from engaging in data transfer between the UE and the network cache.

A wireless communication network typically comprises a plurality of radio base stations. A radio base station in use typically has a coverage area in which UEs being located are provided with services offered by the wireless communication network. The coverage area is also known as a cell. When a UE is being served by a radio base station, the radio base station is called the serving radio base station and the coverage area of the serving radio base station, i.e. the cell, is called the serving cell.

An exemplifying embodiment of a method in a NRE will now be described with reference to FIG. 1a, which is a flowchart of such a method in a NRE for use in a wireless communication network for enabling controlling data transfer between a first UE and a network cache according to an exemplifying embodiment. The NRE is adapted to communicate with a Network Conditions Information Entity, NCIE.

Figure 1A:
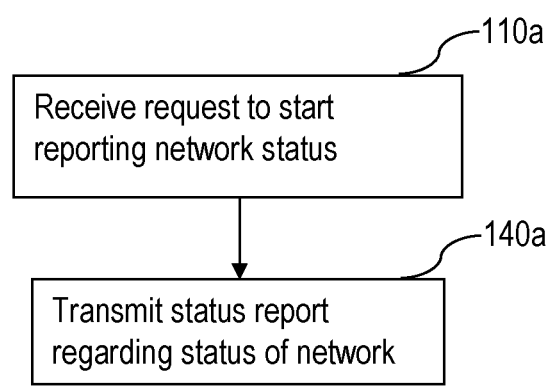
FIG. 1a is a flowchart of a method in a network reporting entity according to an exemplifying embodiment.

FIG. 1a illustrates the method comprising receiving 110a, from the first UE, a request to start reporting network status. The method further comprises transmitting 140a, to the first UE, information regarding the status of the network, the information pertaining to whether network condition is in a state where a data transfer is preferred or not, wherein the NRE obtains the information regarding the status of the network from the NCIE. In this manner, the first UE is enabled to control the data transfer between the UE and the network cache.

The NRE obtains the information regarding the status of the network from the NCIE. The NCIE is e.g. a radio logic such a Radio Resource Management, RRM, entity or a Measuring Probe, MP, which is constantly updated with or constantly measures the current situation or condition of the wireless communication network and on the current situation or condition in the separate cells in the wireless communication network. The NCIE is in one example implemented in a Radio Network Controller, RNC, which controls at least one radio base station. The NRE is adapted to communication with at least one radio base station.

When the NRE receives 110a the request from the first UE, the NRE obtaining the information regarding the status of the network from the NCIE, the NRE then transmits 140a the information regarding the status of the network to the first UE which requested the information. The information informs the UE whether the network condition is in a state where a data transfer is preferred or not. Then the UE may, at least partly based on the received information, make a decision, i.e. control, the data transfer between the first UE and the network cache.

The method in the NRE has several advantages. One advantage is that the NRE provides the UE with information such that the UE can initiate data transfer at the most favourable conditions regarding the load in the wireless communication network. It further enables the UE to decide whether to engage in data transfer with regards to both the network conditions and with regards to the need for the UE to engage in the data transfer. A further advantage is that traffic load can be smoothed out over time, meaning that the UE may, based on the information from the NRE, refrain from engaging in transferring data with the network cache during periods of high traffic load in the cell or in the wireless communication network and instead engage in transferring data with the network cache during periods of low traffic load in the cell or in the wireless communication network.

According to an embodiment, the network status comprises information regarding at least one of start/stop sending, radio conditions, backhaul capacity, transport network load and traffic load within the cell in which the first UE is being served.

The network status information may pertain to the current situation or conditions in the serving cell, to the current situation or conditions in several cells and to the current situation or conditions in the network nodes being involved or affected by the data transfer between the first UE and the network cache. In one example, the traffic load of the serving cell is very high whereby the network condition is in a state where a data transfer is not preferred, as seen from the network side. In another example, the traffic load of the serving cell is low, but the backhaul capacity is very limited whereby the network condition is in a state where a data transfer is not preferred, as seen from the network side. In still an example, the traffic load of the serving cell is low and the backhaul capacity is high whereby the network condition is in a state where a data transfer is preferred, as seen from the network side. Another example of information which may be comprised in the status network report is Channel quality Index, CQI.

Figure 1B:
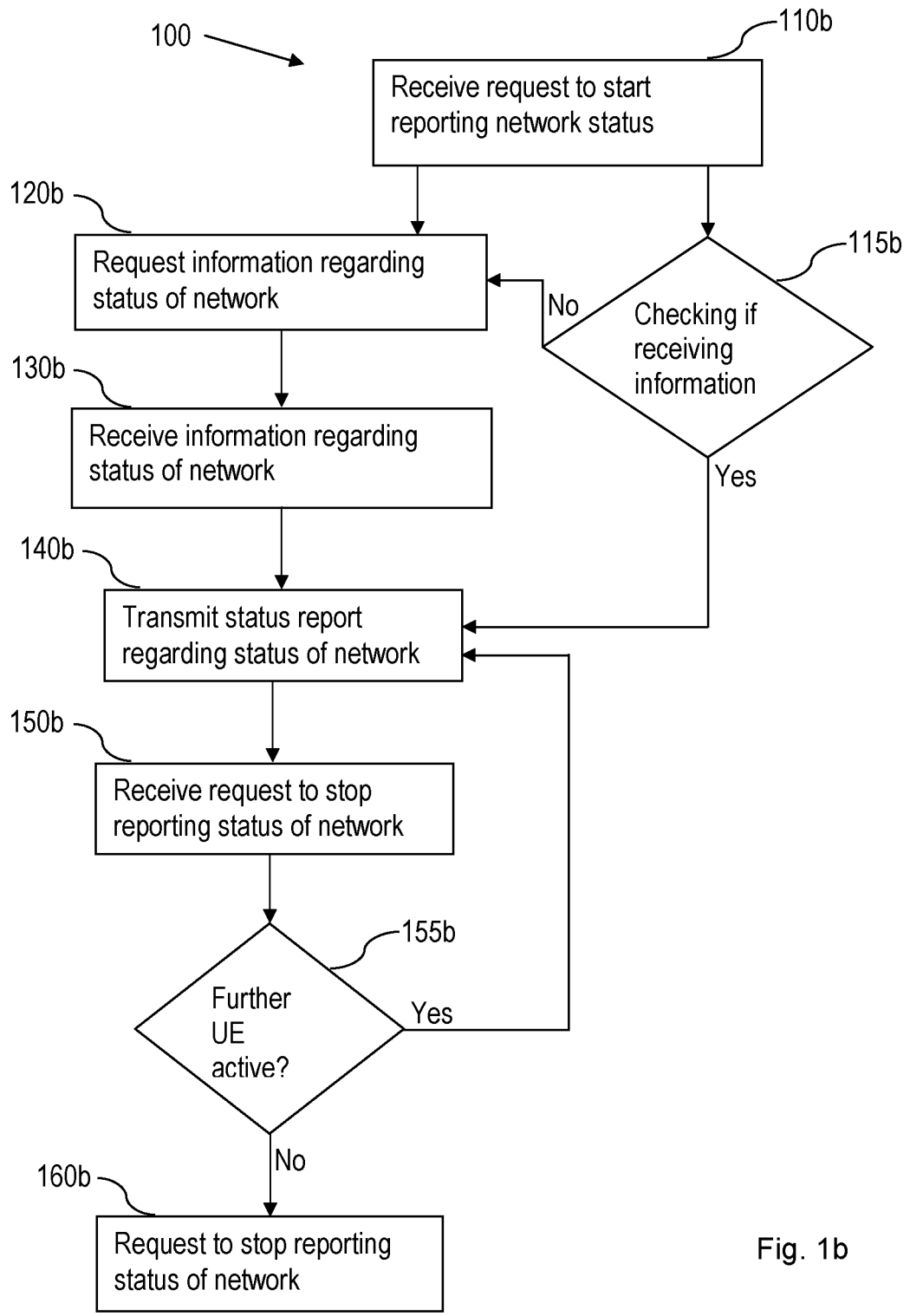
FIG. 1b is a flowchart of a method in a network reporting entity according to an exemplifying embodiment.

FIG. 1b is a flowchart of a method in a network reporting entity according to an exemplifying embodiment. FIG. 1b illustrates the method comprising the corresponding steps 110b and 140b as compared to steps 110a and 140a in FIG. 1a.

FIG. 1b illustrates the embodiment of the method further comprising checking 115b if the NRE currently is receiving, from the NCIE, information regarding the status of the network in relation to the cell in which the first UE is being served when the NRE receives 110b the request to start reporting network status from the first UE. If this is the case then the method comprises transmitting 140b the received information regarding the status of the network to the first UE.

In this example, the NRE may or may not be receiving information regarding the status of the network in relation to the cell in which the first UE is being served from the NCIE. The NRE must then first check whether if it is currently receiving the information from the NCIE so that the NRE is able to transmit the requested information the first UE. In this example, the NRE is currently receiving information regarding the status of the network in relation to the cell in which the first UE is being served from the NCIE and may, consequently, transmit 140b the information regarding the status of the network to the first UE.

FIG. 1b also illustrates an example when the NRE is not currently receiving information regarding the status of the network in relation to the cell in which the first UE is being served from the NCIE. In this example, the method comprises checking 115b if the NRE currently is receiving, from the NCIE, information regarding the status of the network in relation to the cell in which the first UE is being served when the NRE receives 110b the request to start reporting network status from the first UE as described above. In this example, the check 115b results in the NRE detecting that it the NRE currently is not receiving, from the NCIE, information regarding the status of the network in relation to the cell in which the first UE is being served. Then method then comprises requesting 120b, from the NCIE, information regarding the status of the network and receiving 130b, from the NCIE, information regarding the status of the network.

In order for the NRE to transmit information regarding the status of the network in relation to the cell in which the first UE is being served to the first UE, the NRE must be in possession of the information in question. In this case, the NRE does not have the information that the first UE requests. Consequently, the NRE must first obtain the information before the NRE can transmit the information to the first UE. This is performed in steps 120b and 130 b as illustrated in FIG. 1b.

According to an embodiment, the data transfer between the first UE and the network cache comprises uploading of information from the first UE to the network cache.

According to still an embodiment, the data transfer between the first UE and the network cache comprises downloading of information from the network cache to the first UE.

The. transfer of data, can comprise uploading information from the UE to the network cache and/or downloading information from the network cache to the UE.

Just as an example, a user of the UE wants to upload a set of pictures to a social network site, i.e. the network cache in this example. Assuming that many pictures is to be uploaded, the uploading may consume a substantial amount of capacity in either the cell by which the UE is being served or in the transport network between the UE and the network cache. Before initiating upload of the pictures to the social network site, the UE requests network status information in order to obtain knowledge of the current conditions in the network. In case the network conditions are such that it is not desirable from a network side of view, the UE may determine to postpone the upload to the social network site since the uploading of the pictures may not be time critical. Later in time, the UE receives network status information indicating a more favourable state, i.e. more favourable conditions in the network, the UE may decide to engage in uploading of the pictures to the social network site.

In another example, the user of the UE subscribes to a newspaper in such a way that e.g. once every 12 or every 24 hours the service provider of the newspaper issues an updated version of the newspaper to the network cache. The UE is in this example configured to download the newspaper from the network cache at appropriate time intervals. Before the UE engages in downloading of the newspaper from the network cache, the UE first requests network status information. Once the UE has received the network status information, the UE is enabled to determining, i.e. control, the downloading of the newspaper from the network cache to the UE at least partly based on the received network status information in the same manner as described above.

Again with reference to FIG. 1b, according to an embodiment, the method further comprises receiving 150b, from the first UE, a request to stop reporting network status information in relation to the cell in which the first UE is being served. The method also comprises checking 155b if the NRE is currently transmitting information regarding the status of the network to any further UE being served by the same cell as the first UE. If the NRE is not currently transmitting information regarding the status of the network to any further UE being served by the same cell as the first UE, then the method comprises requesting 160b the NCIE entity to stop reporting network status.

In one example, the NRE serves just one cell or radio base station, i.e. the cell in which the first UE is located and the NRE stops transmitting network status information to the first UE which requests to not receive any more network status information. However, there may be further UEs currently receiving network status information, the further UEs being located in the same cell as the first UE which just requested an end of receiving network status information. If there are further UEs in the same cell currently receiving network status information, then the NRE needs to still receive network status information from the NCIE in order to provide this information to the further UEs. If there are no further UEs in the cell in question, the NRE requests 160b the NCIE to stop reporting network status information.

Alternatively, if the NRE serves more than just one cell or radio base station, the NRE stops transmitting network status information to the first UE which requests to not receive any more network status information. However, the NRE may or may not request the NCIE to stop reporting network status information specifically relating to the cell in which the first UE is located, granted that the NRE is not transmitting network status information to any further UE in the cell in which the first UE is located. In any case, since the NRE is serving more than one cell in this example, the NRE may not request the NCIE to stop reporting network status information altogether as long as there is at least one UE in any of the cells which the NRE serves, which UE is still receiving network status information. The reason why the NRE may perhaps not request the NCIE to stop reporting network status information specifically relating to the cell in which the first UE is located, granted that the NRE is not transmitting network status information to any further UE in the cell in which the first UE is located, is that the network status information may comprise information pertaining to more than just the specific cell. Examples of that the network status information may comprise are given above.

Embodiments herein also relate to a method in a UE for controlling data transfer between the UE and a network cache in a wireless communication network.

Such a method in a UE will now be described with reference to FIG. 2a, which is a flowchart a method in a network reporting entity according to an exemplifying embodiment.

Figure 2A:
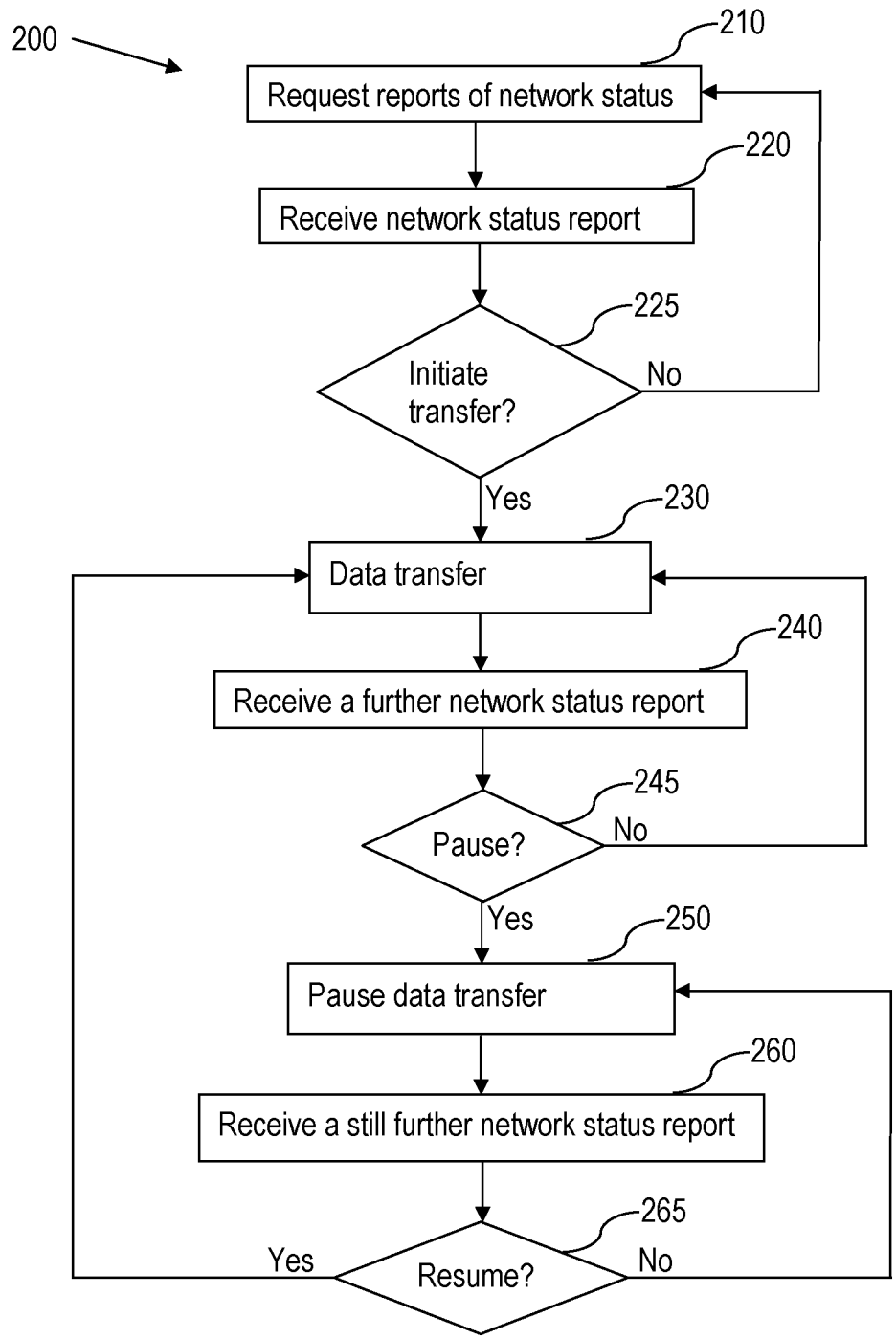
FIG. 2a is a flowchart of a method in a user equipment according to an exemplifying embodiment.

FIG. 2a illustrates the method 200 in the UE comprising requesting 210, from a Network Reporting Entity, NRE, a report regarding the status of the wireless communication network. The method further comprises receiving 220, from the NRE, the report regarding the status of the wireless communication network and determining 225 whether to initiate data transfer between the UE and the network cache based on the received status report of the wireless communication network.

In this example, the UE has determined that a data transfer is to take place between the UE itself and the network cache. Before the UE determines whether to initiate the data transfer, the UE requires information pertaining to the status of the network. In order to obtain this information, the UE transmits a request for network status information to the NRE. Once the NRE has received the request, corresponding to step 110a and 11b in FIGS. 1a and 1b, the NRE transmits the network status information to the UE in steps 140a and 140 b as described above. Reverting to FIG. 2a, the UE receives the network status information in a report from the NRE in step 220.

Once the UE is in possession of the network status information, the UE determines 225 whether to initiate data transfer between the UE and the network cache based on the received status report of the wireless communication network. The UE may decide to engage in or initiate the data transfer, illustrated in FIG. 2a by step 230. The decision whether to initiate the data transfer between the UE and the network cache is at least partly based on the network information status. However, the UE may also consider other factors in conjunction with the network information status. The data transfer may be associated with a priority causing the UE to still initiate the data transfer even in case of somewhat unfavourable network conditions or status.

According to an embodiment, wherein the UE has initiated data transfer between the UE and the network cache, the method comprises receiving 240 a further report regarding the status of the wireless communication network from the NRE and determining 225 whether to uphold 230 or pause 250 the data transfer between the UE and the network cache based on the received further status report of the wireless communication network.

In this example, the UE has initiated the data transfer between the UE and the network cache. The data transfer comprises uploading of data information from the UE to the network cache and/or downloading of data information from the network cache to the UE. During this ongoing data transfer, the UE receives 240 a further report regarding the status of the wireless communication network from the NRE. The further report regarding the status of the wireless communication network may or may not indicate a change in conditions or status of the network. Based at least partly on the current situation according to the further received network status report, the UE determines whether to continue 230 the data transfer or to make a pause 250 of the data transfer. The decision may e.g. partly also be based on the amount of the remaining data to be transferred in the data transfer between the UE and the network cache and/or a priority assigned to the data to be transferred.

According to yet an embodiment, wherein the UE has paused 250 the data transfer between the UE and the network cache, the method comprising receiving 260 still a further report regarding the status of the wireless communication network from the NRE and determining 265 whether to resume 230 the data transfer between the UE and the network cache based on the received still further status report of the wireless communication network.

In this example, the UE has determined to pause 250 the data transfer between the UE and the network cache. This has been done as described above. The determination whether to pause or uphold the data transfer is illustrated in FIG. 2a by step 245. At some point in time after the UE has paused 250 the data transfer, the UE receives still a further network status report from the NRE. The network status report may indicate no change in network status or network conditions, or a change in network conditions for the better or for the worse. E.g. the traffic load in the cell may have increased or decreased, the backhaul capacity has increased or decreased. Depending on the current or latest network conditions, the UE determines whether to keep the data transfer paused, illustrated by steps 236 and 250 in FIG. 2a; or to resume the data transfer between the UE and the network cache, illustrated by steps 265 and 230 in FIG. 2a.

Figure 2B:
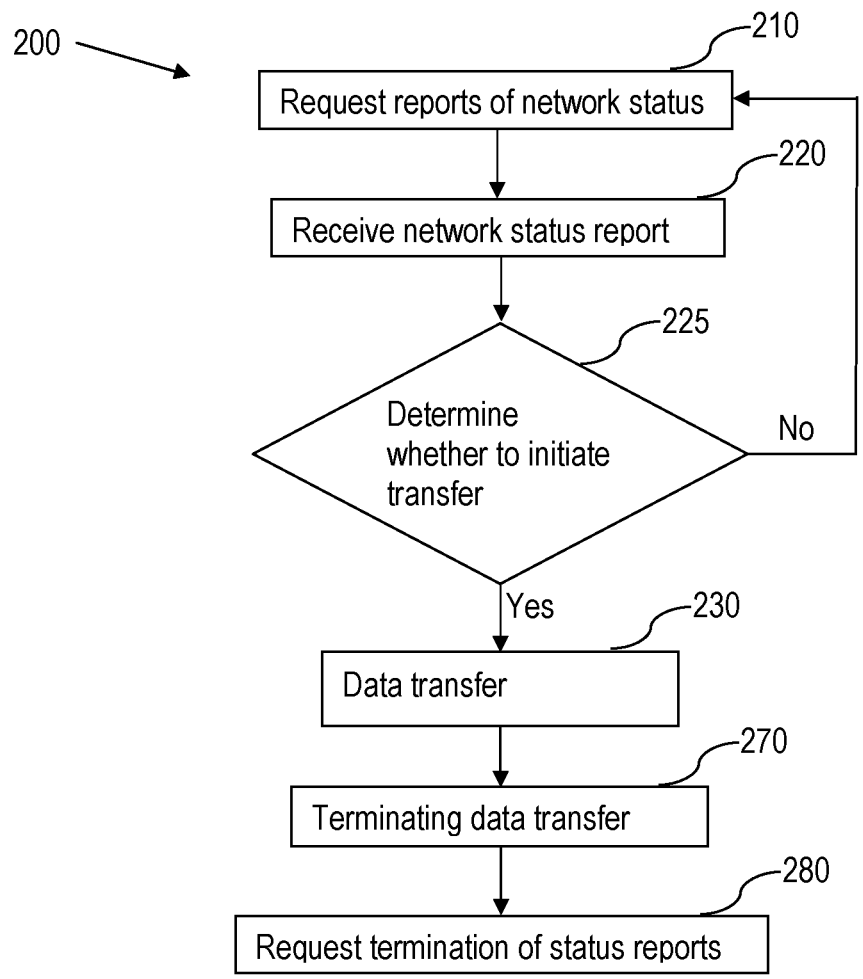
FIG. 2b is a flowchart a method in a user equipment according to an exemplifying embodiment.

FIG. 2b is a flowchart a method in a UE according to an exemplifying embodiment.

According to the embodiment illustrated in FIG. 2b, the method further comprises terminating 270 the data transfer between the UE and the network cache, and requesting 280 the NRE to stop reporting the status of the wireless communication network.

In this example, the UE and the network cache are transferring data, illustrated by step 230 in FIG. 2b. This corresponds to the same step 230 in FIG. 2a. The data transfer comprises uploading data from the UE to the network cache and/or downloading of data from the network cache to the UE. When the data transfer is completed, i.e. all the data that was supposed to be transferred has indeed been transferred, the UE terminates 270 the data transfer, i.e. the data transfer, between the UE and the network cache. In other words the UE stops uploading data to the network cache or stops downloading data from the network cache. When the data transfer is completed, the UE has no need of network status information and consequently sends 280 a request to the NRE to stop sending reports of the network status to the UE.

The reports regarding network status information may be sent from the NRE or the NCIE regularly, irregularly, continuously or on demand. Typically, the reports are sent regularly at a certain time interval. The time interval between two consecutive reports is e.g. configured in an Operation, Administration and Maintenance, OAM, system. The NCIE and/or the NRE then retrieves the time interval configuration from the OAM system. The time interval is configured in a manner such that it is long enough to avoid excessive signalling and short enough to provide accurate information regarding the status, or conditions, of the network. Furthermore, the NCIE may alternatively be configured to only send network status information to the NRE in case a predefined minimum change in status or conditions of the network occurs. Likewise the NRE may alternatively be configured to only send network status information to the UE in case a predefined minimum change in status or conditions of the network occurs. This is to avoid sending reports in case minor changes in the status or conditions in the network occur. In still another example, the change in status or conditions of the network occurs is weighted against a time period, meaning that the predefined minimum change in status or conditions of the network must occur during a predefined minimum duration in time, in order for the NRE 300 or the NCIE 350 to send a network status information report.

As described above, the status or conditions in the network comprises information regarding at least one of start/stop sending, radio conditions, backhaul capacity, transport network load and traffic load within the cell in which the first UE is being served. Further examples of information comprised in the status or conditions in the network are bitrate used by the UEs being served by a specific serving radio base station, volumes of data (in Mbytes) being transferred between serving radio base station and UEs being served by this radio base station. Further examples are transmission power being used by the radio base station and/or per the UEs being served by the radio base station. Still an example is CQI.

Embodiments herein also relates to a NRE for use in a wireless communication network, the NRE being adapted to enable controlling data transfer between a first UE and a network cache. The NRE is also adapted to communicate with a Network Conditions Information Entity, NCIE.

The NRE has the same advantages, objects and technical features as the method performed therein described above. Therefore, the NRE will only be described in brief in order to avoid unnecessary repetition.

Figure 3:
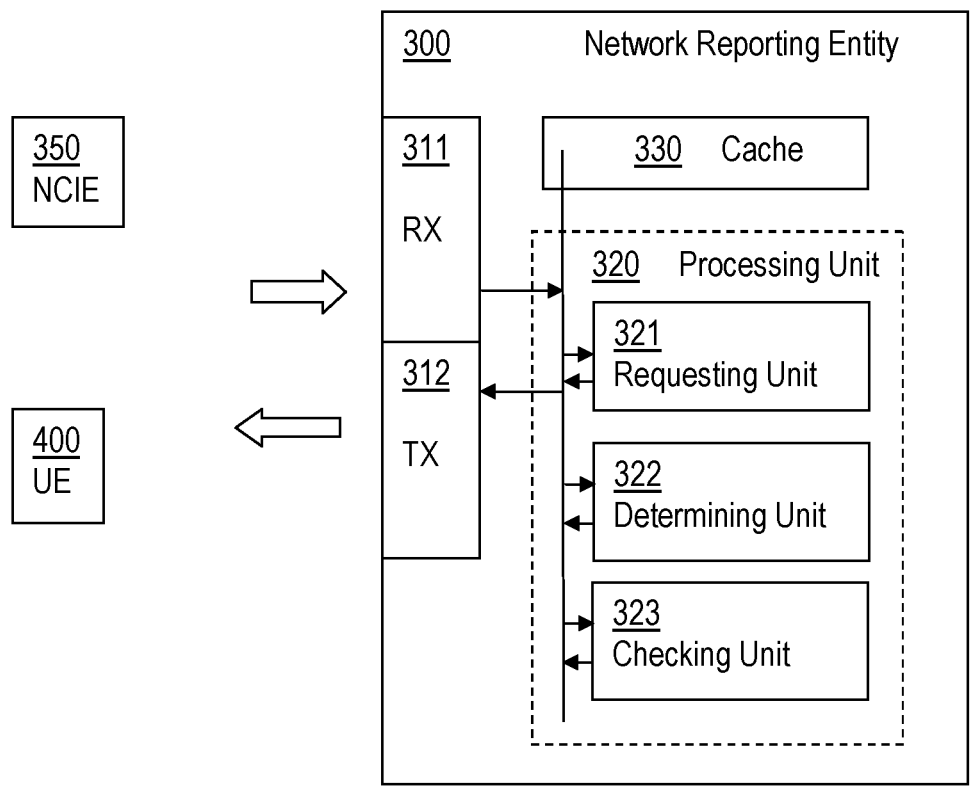
FIG. 3 is a block diagram of a network reporting entity according to an exemplifying embodiment.

Such a NRE will be described with reference to FIG. 3, which is a block diagram of a NRE 300 according to an exemplifying embodiment. FIG. 3 illustrates the NRE 300 comprising a receiving unit 311 adapted to receive a request from the first UE 400 requesting starting to report network status information to the first UE 400. The NRE 300 further comprises a transmitting unit 312 adapted to transmit, to the first UE 400, information regarding the status of the network. The information pertains to whether the network condition is in a state where a data transfer is preferred or not, wherein the NRE 300 obtains the information regarding the status of the network from the NCIE 350. In this manner, the first UE 400 is enabled to control the data transfer between the UE 400 and the network cache (not shown in FIG. 3).

The NRE 300 has several advantages. One advantage is that the NRE provides the UE with information such that the UE can initiate data transfer at the most favourable conditions regarding the load in the wireless communication network. It further enables the UE to decide whether to engage in data transfer with regards to both the network conditions and with regards to the need for the UE to engage in the data transfer. A further advantage is that traffic load can be smoothed out over time, meaning that the UE may, based on the information from the NRE, refrain from engaging in data transfer with the network cache during periods of high traffic load in the cell or in the wireless communication network and instead engage in data transfer with the network cache during periods of low traffic load in the cell or in the wireless communication network.

FIG. 3 illustrates the NRE 300 comprising a Processing Unit 320 which in turn comprises dedicated units adapted to perform different tasks as will be described below. The NRE 300 further comprises a cache 330 or a memory which in an example is adapted to store at least the latest received network information status from the NCIE 350.

According to an embodiment, the network status comprises information regarding at least one of start/stop sending, radio conditions, backhaul capacity, transport network load and traffic load within the cell in which the first UE 400 is being served.

According to yet an embodiment, the NRE 300 further comprises a checking unit 323 adapted to check if the NRE 300 currently is receiving information regarding the status of the network in relation to the cell in which the first UE 400 is being served from the NCIE 350 when the NRE 300 receives the request to start reporting network status information from the first UE 400. If this is the case, the transmitting unit 312 is further adapted to transmit the received information regarding the status of the network to the first UE 400.

According to still an embodiment, if the NRE 300 currently is not receiving information regarding the status of the network in relation to the cell in which the UE is being served from the NCIE 350, the NRE 300 further comprises a requesting unit 321 adapted to request information regarding the status of the network from the NCIE 350, wherein the receiving unit 311 is adapted to receive information regarding the status of the network from the NCIE 350.

It shall be pointed out that the requesting unit 321 is adapted to request information regarding the status of the network from the NCIE 350 via the transmitting unit 312.

According to an embodiment, the data transfer comprises uploading of information from the first UE 400 to the network cache.

According to an embodiment, the data transfer comprises downloading of information from the network cache to the first UE 400.

According to yet an embodiment, the receiving unit 311 is further adapted to receive a request to stop reporting network status in relation to the cell in which the first UE 400 is being served from the first UE 400. The checking unit 323 further is adapted to check if the NRE 300 is currently transmitting information regarding the status of the network to any further UE being served by the same cell as the first UE 400. If the NRE 300 is not currently transmitting information regarding the status of the network to any further UE being served by the same cell as the first UE 400, then the requesting unit 321 further is adapted to request the NCIE 350 entity to stop reporting network status.

The NRE 300 is in one example further adapted to calculate the best strategy for sending the reports regarding network status information to all UEs subscribing to the network status reports, i.e. all UEs having requested to receive network status reports. This is to best utilise network capacity. Few UEs is possibly the best strategy to have where the data is transferred as fast as possible. This will also enable saving battery capacity for the UEs to be in active status, i.e. being engaged in data transfer, as short time as possible.

In one example, the NRE 300 is further adapted to receive network status information reports from the NCIE 350 and, before sending network status information reports to all UEs subscribing to the reports, to modify the network status information based on the number of UEs subscribing to the reports. For example, the NCIE 350 sends a network status information report to the NRE 300 indicating a relatively low load or relatively favourable conditions of the wireless communication network. The NRE 300 determines that there is a relatively high number of UEs subscribing to the reports. The NRE 300 then modifies the network status report, according a predefined algorithm, such that the conditions of the wireless communication network are indicated to be somewhat less favourable in order to avoid a situation where all the UEs engage in data transfer causing the status or conditions of the wireless communication network to rapidly deteriorate, which in turn might cause all or most of the UEs to temporarily pause their respective data transfer. Alternatively, the NRE 300 sends the network status report to all the UEs subscribing to the reports indicating the status of the network as having been determined by the NCIE 350 but the NRE 300 also adds information indicating to all the UEs the number of UEs currently subscribing to the reports. In this manner, the UEs are enabled to individually determine whether or not to initiate, pause or resume data transfer.

Embodiments herein also relates to a UE adapted to control data transfer between the UE and a network cache in a wireless communication network.

The UE has the same advantages, objects and technical features as the method performed therein described above. Therefore, the UE will only be described in brief in order to avoid unnecessary repetition.

Such a UE will now be described with reference to FIG. 4, which is block diagram of a UE 400 according to an exemplifying embodiment.

Figure 4:
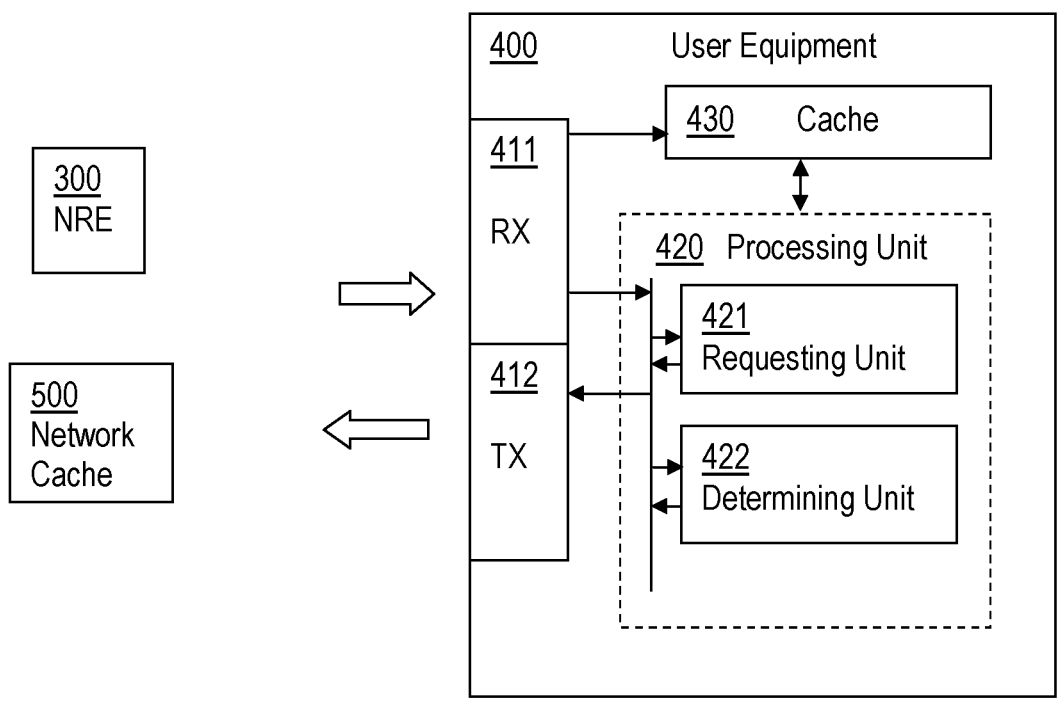
FIG. 4 is a block diagram of a user equipment according to an exemplifying embodiment.

FIG. 4 illustrates the UE 400 comprising a requesting unit 421 adapted to request a report regarding the status of the wireless communication network from a NRE 350; and a receiving unit 411 adapted to receive the report regarding the status of the wireless communication network from the NRE 300. The UE 400 further comprises a determining unit 422 adapted to determine whether to initiate data transfer between the UE 400 and the network cache 500 based on the received status report of the wireless communication network.

FIG. 4 illustrates the UE 400 comprising a Processing Unit 420 which is turn comprises different units adapted to perform the different tasks of the UE. FIG. 4 also illustrates the UE 400 comprising a cache 430 or memory. The cache or memory 430 is in one example adapted to be used for storing downloaded information from the network cache 500. In case the UE 400 uploads data to the network cache 500, the data that is uploaded is held in the cache or memory 430 of the UE 400.

According to an embodiment, wherein the UE400 has initiated data transfer between the UE 400 and the network cache 500, the receiving unit 411 further is adapted to receive a further report regarding the status of the wireless communication network from the NRE 300. The determining unit 422 further is adapted to determine whether to uphold or to pause the data transfer between the UE 400 and the network cache 500 based on the received further status report of the wireless communication network.

According to yet an embodiment, wherein the UE 400 has paused the data transfer between the UE 400 and the network cache 500, the receiving unit 411 further is adapted to receive still a further report regarding the status of the wireless communication network from the NRE 300 and the determining unit 422 further is adapted to determine whether to resume the data transfer between the UE 400 and the network cache 500 based on the received still further status report of the wireless communication network.

According to still an embodiment, the determining unit 422 further is adapted to terminate the data transfer between the UE 400 and the network cache 500 and the requesting unit 421 further is adapted to request the NRE 300 to stop reporting the status of the wireless communication network.

Figure 5:
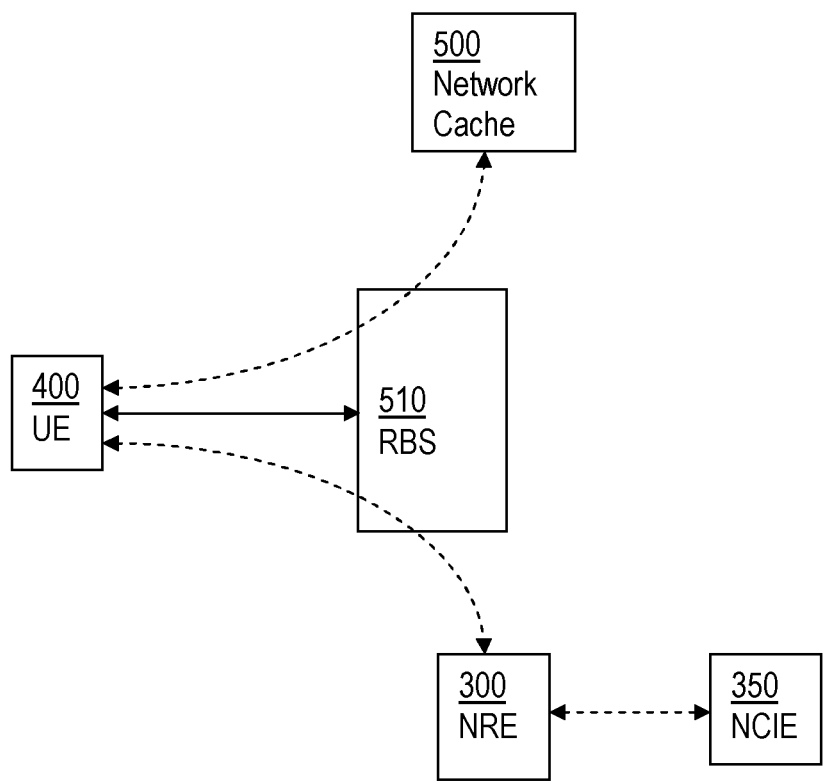
FIG. 5 is a schematic architecture overview of a system or network in which client controlled caching can be implemented, according to further possible embodiments.

FIG. 5 is a schematic architecture overview of a system or network in which client controlled caching can be implemented, according to further possible embodiments.

FIG. 5 illustrates the first UE 400 communicating with the NRE 300. Since the communication network is a wireless or cellular communication network, the UE communicates directly with a radio base station, RBS, 510. This means that when the UE 400 communicates with the NRE 300, all communication messages or signals go via the RBS 510. A wireless communication network can be said to comprise a radio access network, RAN, and a core network. The RAT typically comprises RBSs and Radio Network Controllers, RNCs, or radio Base Station Controllers, BSCs. The core network comprises a plurality of nodes, e.g. switching centres, home location registers or subsystems, gateways to other networks and so on. In one example, the NRE 300 is comprised in the RAN, e.g. as a standalone node or comprised in a RBS or a RNC/BSC.

FIG. 5 further illustrates the NRE 300 being able to communicate with the NCIE 350. The NCIE 350 is e.g. a radio logic such a Radio Resource Management, RRM, entity or a Measuring Probe, MP, which is constantly updated with or constantly measures the current situation or condition of the wireless communication network and on the current situation or condition in the separate cells in the wireless communication network. The NCIE 350 is in one example comprised in the RAN, e.g. as a standalone node or comprised in a RBS or a RNC/BSC.

FIG. 5 further illustrates the UE 400 being able to communicate with the network cache 500, i.e. uploading or downloading of data as described above. Also the communication between the UE 400 and the network cache 500 goes via the RBS 510. The network cache 500 is in one example implemented in the RAN in the same manner as the NRE 300 and the NCIE 350. In another example, the network cache 500 is implemented in the core network, either as a standalone node in the core network or incorporated into an already existing core network node. In still an example, the network cache 500 is implemented in a different network than the wireless communication network. In this latter example, the UE 400 communicates with the network cache via the RBS 510 and through a network gateway, which gateway so to say connects the wireless communication network and the network in which the network cache 500 is implemented.

Figure 6:
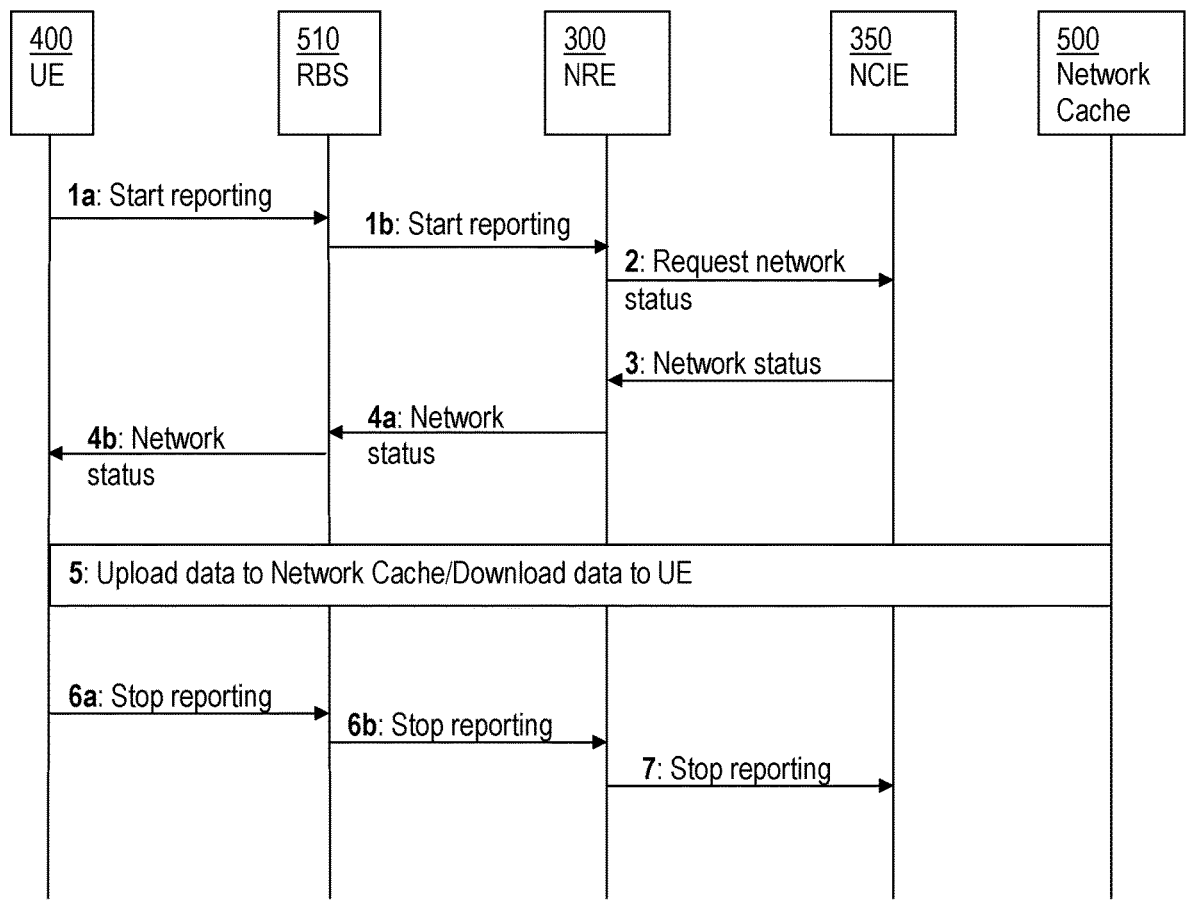
FIG. 6 is a signalling diagram schematically illustrating a practical example of interaction between different nodes and entities for client controlled caching, when using the solution.

FIG. 6 is a signalling diagram schematically illustrating a practical example of interaction between different nodes and entities for client controlled caching, when using the solution. The communication or signalling between the UE 400 and the NRE 300 is e.g. made by standard IP signalling and routing mechanisms. Another example of signalling is extended Network Access Stratum, NAS, signalling with extensions in the signalling.

In FIG. 6, the first UE 400 wishes to initiate a data transfer with the network cache 500. Before initiating the data transfer, the UE 400 requests network status information from the NRE 300 in order to be able to determine whether the state, or conditions, of the communication network are such that they are favourable, from a network point of view, for the data transfer or if the state, or conditions, of the communication are such that the data transfer would cause excessive load on the communication network.

FIG. 6 illustrates the first UE 400 first sending a request to the NRE 300 to start reporting network status information to the UE 400. This request is sent via the RBS 510 which is currently serving the UE 400. In other words, the UE 400 sends a signal "1a: Start reporting" to the RBS 510 which forwards the signal to the NRE 300 by sending a signal "1b: Start reporting" to the NRE 300.

The NRE in this example is not currently receiving network status information from the NCIE 350 and consequently, send a request to the NCIE 350 to start reporting network status information to the NRE 300. This is illustrated in FIG. 6 by the NRE 300 sending the signal "2: Request network status" to the NCIE 350, which starts reporting the network status information to the NRE 300 by sending the signal "3: Network status". It shall be noted that in FIG. 6, it is illustrated that the network status is reported only once by the signal "3: Network status". However, FIG. 6 is merely a schematic illustration and the network status information may be reported regularly or continuously by sending the signal "3: Network status" at certain time intervals.

Once the NRE 300 receives the network status information by receiving the signal "3: Network status", the NRE reports or sends the network status information to the UE 400 as a response to the request sent in signal "1b: Start reporting". This is illustrated by the NRE 300 sending a signal "4a: Network status" to the RBS 510, which forwards the signal to the UE 400 by sending the signal "4b: Network status" to the UE 400.

Once the UE 400 has received the network status information, the UE is enabled to control the data transfer, i.e. data transfer, between the UE 400 and the network cache 500. In this example, the UE determines that the network status is such that the data transfer between the UE 400 and the network cache 500 may be performed without causing excessive load on the wireless communication network or on the RBS 510 currently serving the UE 400. Consequently, the UE 400 initiates and controls the data transfer between the UE 400 and the network cache 500. This is illustrated in FIG. 6 by "5: Upload information to Network Cache/Download information to UE". This will be explained in more detail below. The downloading or uploading of data between the UE 400 and the network cache 500 is in one example realized by means of HTTP-Get messages or TCP messages.

Once the data transfer is completed, the UE 400 terminates the data transfer and is then no longer in need of receiving network status information reports. Consequently, the UE 400 requests the NRE 300 to stop reporting the network status information to the UE 400. This is illustrated in FIG. 6 by the UE 400 sending a signal "6a: Stop reporting" to the RBS 510, which forwards the signal to the NRE 300 by sending the signal "6b: Stop reporting" to the NRE 300. In this example, the NRE is not serving any further UEs and is hence not itself in need of obtaining network status information from the NCIE 350. Consequently, the NRE 300 sends a signal "7: Stop reporting" to the NCIE 350 requesting the NCIE 350 to stop sending network status information to the NRE 300.

It shall be noted that the time between the sending of the signal "1a: Start reporting" and the reception of the first network status report in signal "4b: Network status" may be relatively long. In case the UE 400 is moving around in the wireless communication network, the UE 400 may have been handed over to another RBS than the one which was serving the UE 400 when the UE sent the "1a: Start reporting" signal. A possible consequence of a handover is that the UE will not receive the signal "4b: Network status". Alternatively, the signal "1a: Start reporting" may be lost due to an error situation somewhere between the UE 400 and the NRE 300, whereby the UE 400 will not receive the signal "4b: Network status". In one example, the UE 400 starts an internal timer when the UE sends the signal "1a: Start reporting". If the timer expires before the UE receives the signal "4b: Network status", the UE re-sends the signal "1a: Start reporting".

Figure 7:
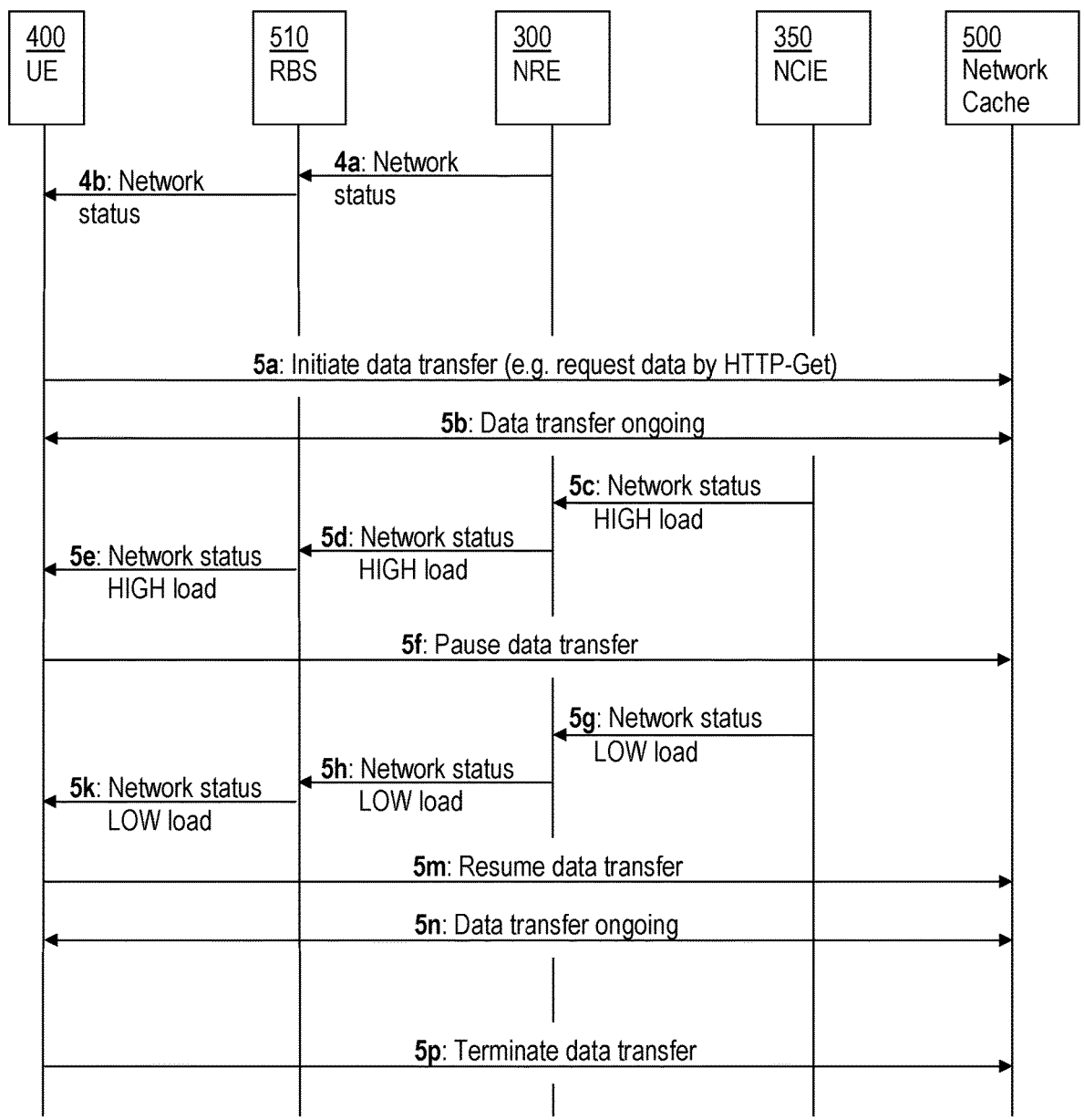
FIG. 7 is a signalling diagram schematically illustrating a practical example of interaction between different nodes and entities for client controlled caching, when using the solution.

FIG. 7 is a signalling diagram schematically illustrating a practical example of interaction between different nodes and entities for client controlled caching, when using the solution.

In this example, the signal "4b: Network status" is first being received by the UE 400. The UE 400 determines to initiate data transfer between the UE 400 and the network cache 500. In this example, the UE wants to download data from the network cache 500 to the UE 400. The UE 400 sends a signal "5a: Initiate data transfer" to the network cache 500. The signalling diagram illustrated in FIG. 7 is somewhat simplified and it illustrates the signal "5a: Initiate data transfer" being sent directly to the network cache 500. However, it shall be understood that the UE 400 first sends the signal to the RBS 510, which in turn forwards to signal to the network cache 500. The forwarding of the signal to the network cache may comprise the signal going through a plurality of nodes and/or gateways depending on where the network cache is located or implemented.

Thereafter, the transfer of data, i.e. downloading of data from the network cache 500 to the UE 400 in this example, is ongoing. This is illustrated by "5b: Data transfer ongoing". From this point, the UE 400 is downloading data from the network cache 500. During the downloading of data to the UE 400, the UE may receive a plurality of network status information signals from the NRE 300. At least at one point in time during the ongoing downloading of data from the network cache 500 to the UE 400, the UE receives a signal "5e: Network status HIGH load". This signal is received due to the NCIE 350 reporting a HIGH load to the NRE 300 in signal "5c: Network status HIGH load", which in turns reports the HIGH load network status to the UE 400 by sending a signal "5d: Network status HIGH load" to the UE 400 via the RBS 510.

In this example, the UE 400 determines to temporarily pause the downloading of data from the network cache 500 to the UE 400 by sending a signal "5f: Pause data transfer" to the network cache 500. From this point in time, the downloading is temporarily paused. Again, the UE may receive a plurality of network status information signals or messages from the NRE 300 via the RBS 510. At least in one point in time, the NCIE 350 reports to the NRE 300 that the load in the network is low by sending "5g: Network status LOW load" to the NRE 300, which in turns sends the network status information to the UE 400 via the RBS 510. When the UE 400 receives the signal "5k: Network status LOW load", the UE 400 determines to resume the data transfer, i.e. the downloading of data in this example. The UE 400 sends a signal "5m: Resume data transfer" to the network cache 500, whereby the downloading of data from the network cache 500 to the UE 400 is resumed, illustrated by "5n: Data transfer ongoing".

At a later point in time, the UE 400 has downloaded all the data it wanted from the network cache 500 and then the UE 400 terminates the downloading of data by sending a signal "5p: Terminate data transfer" to the network cache 500.

In an example, when the UE 400 sends the signal "5f: Pause data transfer" to the network cache 500, the UE 400 starts an internal timer. In case the timer expires before the UE 400 receives the signal "5k: Network status LOW load", the UE 400 resumes the downloading of data from the network cache 500. The reason for having this timer is that the signal "5k: Network status LOW load" may be lost due to an error situation, and then the downloading will fail. By introducing the timer, it is ascertained that the downloading will resume at some point in time and thus not fail. In case the network status is still unfavourable for data transfer, seen from a network point of view, the UE 400 will eventually receive a subsequent new status report signal corresponding to the signal "5e: Network status HIGH load", which will cause the UE 400 to anew pause the data transfer and starting the internal timer.

It should be noted that FIGS. 3 and 4 merely illustrate various functional units in the NRE and the UE in a logical sense. The functions in practice may be implemented using any suitable software and hardware means/circuits etc. Thus, the embodiments are generally not limited to the shown structures of the NRE and the UE and the functional units. Hence, the previously described exemplary embodiments may be realised in many ways. For example, one embodiment includes a computer-readable medium having instructions stored thereon that are executable by the respective processing units for executing the functions of the NRE and the UE. The instructions executable by a computing system and stored on the computer-readable medium perform the method steps of the present invention as set forth in the claims.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

What is claimed is:

1. A method in a Network Reporting Entity (NRE) for use in a wireless communication network for enabling a User Equipment (UE) operating in a cell of the wireless communication network to download cached data from a network memory of the wireless communication network utilized for caching data the method comprising:
    receiving, from the UE, a request to start reporting information regarding traffic load, in order for the UE to determine whether to initiate download of the cached data from the network memory to the UE, wherein the cached data is content provided by a service provider and stored in the network memory for later download by the UE;
    obtaining, from a Network Conditions Information Entity (NCIE), the information regarding the traffic load;
    transmitting, to the UE, the information regarding the traffic load, wherein the UE enables the download of the cached data from the network memory based on the information regarding the traffic load and refrains from engaging in the download of the cached data from the network memory during periods of certain traffic load; and
    receiving, from the UE, a request to stop reporting the information regarding the traffic load upon completion of the download of the cached data by the UE.

2. The method according to claim 1, wherein the traffic load pertains to traffic load in the wireless communication network.

3. The method according to claim 1, wherein the traffic load pertains to traffic load in the wireless communication network in relation to the cell.

4. The method according to claim 1, further comprising:
    determining whether the NRE currently is receiving the information regarding the traffic load from the NCIE; and
    when the NRE currently is receiving the information regarding the traffic load from the NCIE, transmitting the currently receiving information regarding the traffic load to the UE.

5. The method according to claim 1, further comprising:
    determining whether the NRE currently is receiving the information regarding the traffic load from the NCIE; and
    when the NRE currently is not receiving information regarding the traffic load from the NCIE, requesting to obtain the information regarding the traffic load from the NCIE to transmit to the UE.

6. The method according to claim 1, wherein the UE enables upload of data to the network memory based on the information regarding the traffic load to upload the data.

7. A method in a User Equipment (UE) for enabling the UE, operating in a cell of a wireless communication network, to download cached data from a network memory of the wireless communication network utilized for caching data, the method comprising:
    requesting, from a Network Reporting Entity (NRE), information regarding traffic load, in order for the UE to determine whether to initiate download of the cached data from the network memory to the UE, wherein the NRE, in response to the requesting from the UE, obtains from a Network Conditions Information Entity (NCIE) the information regarding the traffic load and wherein the cached data is content provided by a service provider and stored in the network memory for later download by the UE;
    receiving, from the NRE, the information regarding the traffic load;
    determining whether to enable the download of the cached data from the network memory based on the information regarding the traffic load, in order to refrain from engaging in the download of the cached data from the network memory during periods of certain traffic load; and
    sending a request to stop reporting the information regarding the traffic load upon completion of the download of the cached data.

8. The method according to claim 7, wherein the traffic load pertains to traffic load in the wireless communication network.

9. The method according to claim 7, wherein the traffic load pertains to traffic load in the wireless communication network in relation to the cell.

10. The method according to claim 7, further comprising:
    enabling upload of data to the network memory, based on the information regarding the traffic load, to upload the data from the UE to the network memory.

11. A Network Reporting Entity (NRE) for use in a wireless communication network for enabling a User Equipment (UE) that operates in a cell of the wireless communication network to download cached data from a network memory of the wireless communication network utilized for caching data, the NRE comprising:
  a processing unit; and
  a storage medium containing instructions which, when executed by the processing unit, instruct the NRE to perform operations to:
    receive, from the UE, a request to start reporting information regarding traffic load, in order for the UE to determine whether to initiate download of the cached data from the network memory to the UE, wherein the cached data is content provided by a service provider and stored in the network memory for later download by the UE;
    obtain, from a Network Conditions Information Entity (NCIE), the information regarding the traffic load;
    transmit, to the UE, the information regarding the traffic load, wherein the UE enables the download of the cached data from the network memory based on the information regarding the traffic load and refrains from engaging in the download of the cached data from the network memory during periods of certain traffic load; and
    receive, from the UE, a request to stop reporting the information regarding the traffic load upon completion of the download of the cached data by the UE.

12. The NRE according to claim 11, wherein the traffic load pertains to traffic load in the wireless communication network.

13. The NRE according to claim 11, wherein the traffic load pertains to traffic load in the wireless communication network in relation to the cell.

14. The NRE according to claim 11, wherein the instructions further instruct the NRE to perform operations to:
  determine whether the NRE currently is receiving the information regarding the traffic load from the NCIE; and
  when the NRE currently is receiving the information regarding the traffic load from the NCIE, transmit the currently receiving information regarding the traffic load to the UE.

15. The NRE according to claim 11, wherein the instructions further instruct the NRE to perform operations to:
  determine whether the NRE currently is receiving the information regarding the traffic load from the NCIE; and
  when the NRE currently is not receiving information regarding the traffic load from the NCIE, request to obtain the information regarding the traffic load from the NCIE to transmit to the UE.

16. A User Equipment (UE), for use in a cell of a wireless communication network, to download cached data from a network memory of the wireless communication network utilized for caching data, the UE comprising:
  a processing unit; and
  a storage medium containing instructions which, when executed by the processing unit, instruct the UE to perform operations to:
    request, from a Network Reporting Entity (NRE), information regarding traffic load, in order for the UE to determine whether to initiate download of the cached data from the network memory to the UE, wherein the NRE, in response to the request from the UE, obtains from a Network Conditions Information Entity (NCIE) the information regarding the traffic load and wherein the cached data is content provided by a service provider and stored in the network memory for later download by the UE;
    receive, from the NRE, the information regarding the traffic load;
    determine whether to enable the download of the cached data from the network memory based on the information regarding the traffic load, in order to refrain from engaging in the download of the cached data from the network memory during periods of certain traffic load; and
    send a request to stop reporting the information regarding the traffic load upon completion of the download of the cached data.

17. The UE according to claim 16, wherein the traffic load pertains to traffic load in the wireless communication network.

18. The UE according to claim 16, wherein the traffic load pertains to traffic load in the wireless communication network in relation to the cell.

19. The UE according to claim 16, wherein the instructions further instruct the UE to perform operations to:
  enable upload of data to the network memory, based on the information regarding the traffic load, to upload the data from the UE to the network memory.

20. A non-transitory computer readable medium having stored thereon instructions which, when executed on a processing unit of a Network Reporting Entity (NRE) used in a wireless communication network for enabling a User Equipment (UE) operating in a cell of the wireless communication network to download cached data from a network memory of the wireless communication network utilized for caching data, instruct the NRE to perform operations comprising:
  receiving, from the UE, a request to start reporting information regarding traffic load, in order for the UE to determine whether to initiate download of the cached data from the network memory to the UE, wherein the cached data is content provided by a service provider and stored in the network memory for later download by the UE;
  obtaining, from a Network Conditions Information Entity (NCIE), the information regarding the traffic load;
  transmitting, to the UE, the information regarding the traffic load, wherein the UE enables the download of the cached data from the network memory based on the information regarding the traffic load and refrains from engaging in the download of the cached data from the network memory during periods of certain traffic load; and
  receiving, from the UE, a request to stop reporting the information regarding the traffic load upon completion of the download of the cached data by the UE.

21. A non-transitory computer-readable storage medium having stored thereon instructions which, when executed on a processing unit of a User Equipment (UE) operating in a cell of a wireless communication network, to download cached data from a network memory of the wireless communication network utilized for caching data, instruct the UE to perform operations comprising:
  requesting, from a Network Reporting Entity (NRE), information regarding traffic load, in order for the UE to determine whether to initiate download of the cached data from the network memory to the UE, wherein the NRE, in response to the requesting from the UE, obtains from a Network Conditions Information Entity (NCIE) the information regarding the traffic load and wherein the cached data is content provided by a service provider and stored in the network memory for later download by the UE;

receiving, from the NRE, the information regarding the traffic load;

determining whether to enable the download of the cached data from the network memory based on the information regarding the traffic load, in order to refrain from engaging in the download of the cached data from the network memory during periods of certain traffic load; and sending a request to stop reporting the information regarding the traffic load upon completion of the download of the cached data.

* * * * *

UNITED STATES PATENT AND TRADEMARK OFFICE
CERTIFICATE OF CORRECTION

PATENT NO. : 10,791,194 B2  
APPLICATION NO. : 15/959149  
DATED : September 29, 2020  
INVENTOR(S) : Westberg et al.

Page 1 of 1

It is certified that error appears in the above-identified patent and that said Letters Patent is hereby corrected as shown below:

In the Specification

In Column 1, Line 8, delete "2014," and insert -- 2014, now Pat. No. 9,967,362, --, therefor.

In Column 3, Line 29, delete "flowchart a" and insert -- flowchart of a --, therefor.

In Column 5, Line 30, delete "information the" and insert -- information to the --, therefor.

In Column 5, Line 45, delete "that it the" and insert -- that if the --, therefor.

In Column 5, Line 48, delete "Then method" and insert -- The method --, therefor.

In Column 7, Line 19, delete "flowchart a" and insert -- flowchart of a --, therefor.

In Column 7, Line 38, delete "11b" and insert -- 110b --, therefor.

In Column 8, Line 38, delete "flowchart a" and insert -- flowchart of a --, therefor.

In Column 11, Line 8, delete "according a" and insert -- according to a --, therefor.

In Column 11, Line 31, delete "is block" and insert -- is a block --, therefor.

In Column 11, Line 35, delete "NRE 350;" and insert -- NRE 300; --, therefor.

In Column 14, Line 27, delete "forwards to signal" and insert -- forwards the signal --, therefor.

In the Claims

In Column 15, Line 51, in Claim 1, delete "data" and insert -- data, --, therefor.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*